May 15, 1928.
J. E. MITCHELL ET AL
1,669,771
METHOD OF RECLAIMING ESCAPED COTTON DISCHARGED
WITH HULLS FROM COTTON CLEANING MACHINES
Filed Sept. 15, 1925
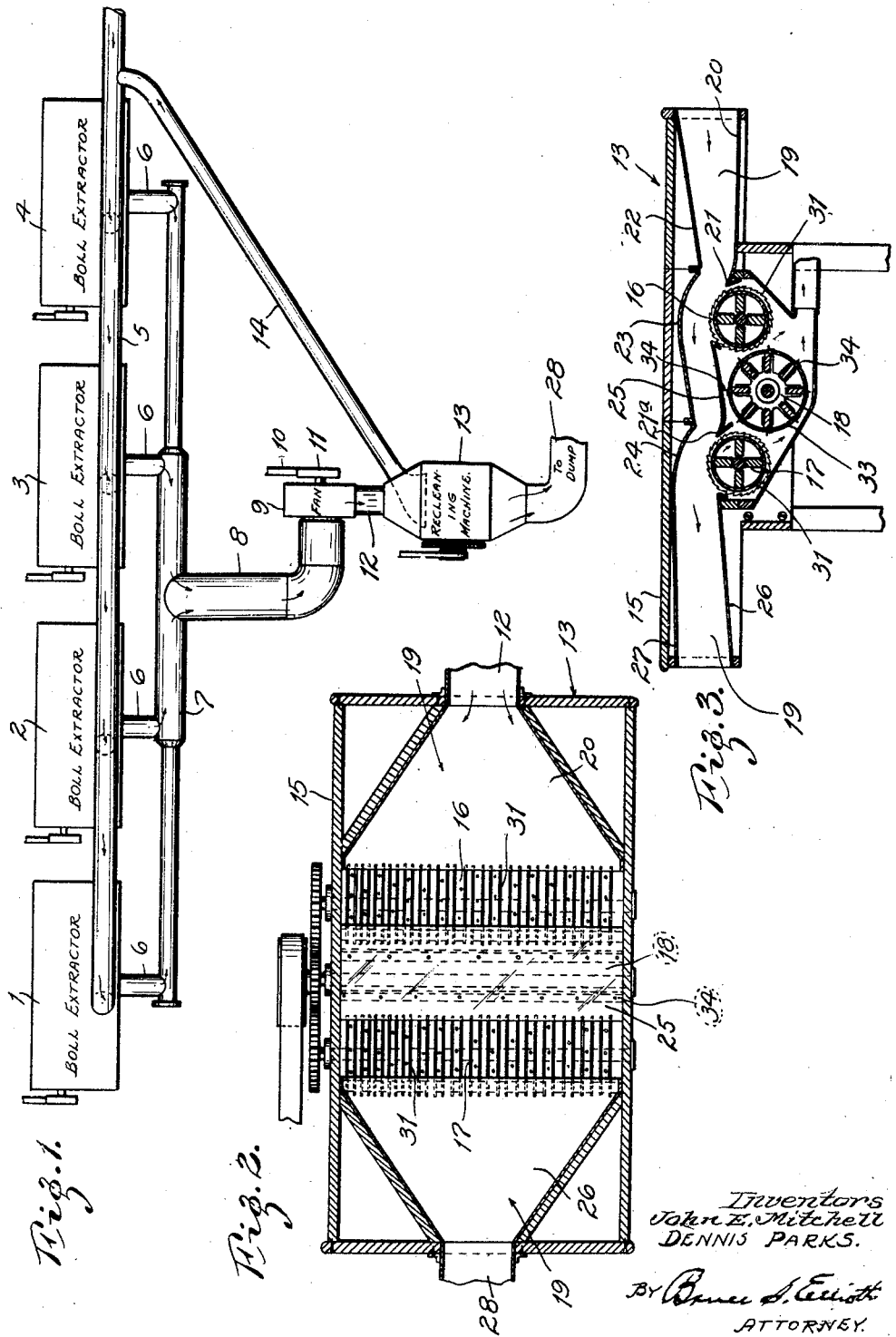

Patented May 15, 1928.

1,669,771

UNITED STATES PATENT OFFICE.

JOHN E. MITCHELL AND DENNIS PARKS, OF ST. LOUIS, MISSOURI.

METHOD OF RECLAIMING ESCAPED COTTON DISCHARGED WITH HULLS FROM COTTON-CLEANING MACHINES.

Application filed September 15, 1925. Serial No. 56,436.

This invention relates to a novel method of reclaiming cotton from the product discharged from one or more cotton cleaning, or boll extracting, machines.

The cotton cleaning machine, for which various patents have heretofore been granted to us, both individually and jointly, operates, in practice, to extract all but a very small percentage of the cotton, and the small percentage that escapes with the hulls is, for the most part, an inferior kind of cotton made up, usually, of hard one-seed locks. Formerly, it was considered desirable to get rid of most of this cotton, but it has been found that if the locks are suitably opened up so that the saws can engage the cotton, the latter can be easily reclaimed, and while not of the value of the best grade of cotton, it is, by no means, an inferior product and is well worth saving, especially in a large gin plant where the quantity of such cotton discharged with the hulls would be considerable in the course of a day's run.

In Patent No. 1,182,193, granted to us May 9th, 1916, there is described a method of recovering cotton from hulls discharged from a battery of machines. This method, briefly, consists in conveying the hulls from a plurality of machines into a single recleaning machine, for the purpose of taking out any cotton that may be in the hulls, and then continuously returning the reclaimed cotton back to the gin. This process, when applied to reclaiming cotton under present conditions, has two pronounced disadvantages: First, it is entirely inadequate in capacity to cope with the large amount of hulls discharged from a battery of four, five, or six of our boll extractors. Since the advent of the cotton cleaning or boll extracting machine, and especially during the past four or five years, the cotton brought to the gin plants has been increasingly mixed with hulls, sticks, and other foreign matter, in addition to unopened bolls. This is probably due to the fact that pickers and others handling the cotton have learned that such trashy cotton can be easily handled with the use of cleaning machines, which are now generally employed on the gins, and hence they are not as careful as formerly to bring only relatively clean cotton to be ginned. The result is that any recleaning machine would now have several times the bulk of hulls and other foreign matter to contend with that it would have had under the conditions that prevailed a few years ago, or, say, at the time the said patent to Mitchell and Parks was granted. It is, therefore, necessary that any recleaning apparatus should be capable of getting rid of hulls, trash, and other foreign matter with great speed. Second, in the Mitchell and Parks recleaning method of the patent referred to, no preparatory treatment is given the small hard locks of cotton that escape with the hulls before they are brought into contact with the saw cylinder of the recleaning machine. This makes it very difficult for the saw cylinder of such machine to extract these hard locks, for the reason that they are likely to bounce off the teeth of the saw in the recleaning machine just as they bounce off the teeth of the saw in the main battery of machines.

The present invention has for its general object to provide a method of operation in the use of which a maximum quantity of mixed cotton and hulls, that is to say, all the hulls and cotton discharged as waste from a main battery of cotton cleaning machines, as many in number as will ordinarily be employed in a gin, may be continuously, and in a substantially uninterrupted manner, subjected to the cotton reclaiming operation, so that no congestion occurs, and the entire discharge of the waste hulls and cotton from the main battery of cotton cleaning machines may be readily and adequately handled for reclaiming the cotton therefrom.

A further object of the invention is to provide for subjecting the hulls and cotton discharging as waste from the main battery of cotton cleaning machines, to such action as will loosen or fluff up the relatively hard cotton locks, so that the cotton thereof may be more readily engaged by the teeth of saw cylinders employed for reclaiming the same.

To this end, the novel method constituting this invention is practiced by continuously withdrawing the waste products from a main battery of cotton cleaning machines, drawing them into and expelling them from a fan casing, in which they are subjected to the action of the fan blades, to loosen up the cotton locks, and projecting the hulls and cotton through a suitable enclosure, and therein continuously removing cotton from the mixture by means of saw cylinders operating in the path of movement thereof, while permitting the free passage out of said enclosure of the hulls.

The accompanying drawing illustrates a preferred form and arrangement of apparatus for practicing the method herein described, such apparatus forming the subject matter of a separate application for patent filed of even date herewith.

In said drawing—

Figure 1 is a plan view, more or less diagrammatic, illustrating in outline a battery of boll extractors, and the means for conveying the hulls, and cotton mixed therewith, discharged therefrom to a recleaning machine, and for returning the cotton recovered in the recleaning machine back to the boll extractors;

Figure 2 is a sectional plan view on an enlarged scale of the recleaning machine; and Figure 3 is a central longitudinal sectional view of the same.

Referring now to the drawing, the numerals 1, 2, 3, and 4 indicate four boll extractors or cotton cleaning machines, which are supplied with the cotton to be cleaned through a feed pipe 5. Leading from the hull discharge of each of the boll extractors is a length of pipe 6, the pipes 6 communicating with a common discharge pipe 7, centrally of which is located a pipe 8, which communicates with the suction side of a fan casing 9, in which is located a fan (not shown), which is driven by a belt 10 and pulley 11. Extending from the outlet of the fan casing 9 is a pipe 12 which communicates with one end of a recleaning machine 13, to be later described. From the recleaning machine, a pipe 14 leads back to the feed pipe 5 for delivering cotton to such pipe to be returned to the boll extractors.

Referring now to Figures 2 and 3, the recleaning machine comprises a casing 15 within which are located two saw cylinders 16 and 17 and a doffer cylinder 18, common to the two saw cylinders. We provide in the casing 15 a passage through which the mixed hulls and cotton from the pipe 12 are blown or discharged by the fan in the casing 9, and in such manner as to come into contact with the saw cylinders 16 and 17.

To this end, we provide within the casing 15 at the top thereof, a sheet metal conduit 19 which, at its outer end, communicates with the discharge pipe 12 from the fan casing 9, and from this point is widened or flared outwardly to the width of the casing 15, which is substantially also the width of the saw cylinder 16, the inner edge of the bottom 20 of this conduit being upwardly curved and positioned in close proximity to the surface of the saw cylinder 16, as indicated at 21. The top 22 of this conduit is downwardly inclined to a point above and at a suitable distance from the upper surface of the saw cylinder 16. Immediately above the saw cylinder 16, the top 22 of the conduit 19 is curved to be substantially concentric with the surface of the saw cylinder, as indicated at 23, and thence is inclined downwardly to a point above and at a suitable distance from the saw cylinder 17. From this point, the top 22 is again curved upwardly, as indicated at 24, to be substantially concentric with the surface of the saw cylinder 17, and thence passes in a substantially straight line to the outer end of the casing 15. Between the saw cylinders 16 and 17, the floor or bottom of the conduit 19 is formed by a sheet metal section 25, which extends substantially parallel with the top of the conduit beyond the curved portion 23, and has its ends located in close proximity to the surfaces of the saw cylinders 16 and 17, the end adjacent the latter cylinder being upwardly curved, as indicated at 21ᵃ. The bottom section 25 is located directly over the doffer cylinder 18. The bottom of the conduit 19 beyond the saw cylinder 17 has its inner end located in close proximity to the surface of the saw cylinders, and thence inclines downwardly to the outer end of the casing, as indicated at 26, and this member and the corresponding portion 27 of the top are outwardly flared from the outer end of the casing to the width thereof adjacent the saw cylinder 17, as shown by Figure 2. At this end of the casing, the conduit 19 communicates with a pipe 28 which leads to the dump.

As will be seen from Figure 3, the conduit 19 in its entrance portion is so shaped that the hulls containing a certain admixture of cotton or cotton locks forced into the same from the pipe 12, and traveling at a relatively high velocity, will be directed by the top portion 22 directly into engagement with the surface of the saw cylinder 16, which moves clockwise, or in a direction the reverse of that of the hulls and cotton. The saw teeth 31 will engage any cotton or cotton locks which are caused to impinge upon the saw cylinder by the force of the blast of air and will be carried beneath the edge 21 of the bottom 20 of the conduit 19, and will be disengaged from the teeth of the saws by the action of the doffer cylinder 18, and will be discharged by the latter through the pipe 14, whence the cotton may be returned to the feed pipe 5 to be delivered to the boll extractors for final separation from any hull particles adhering thereto, or temporarily dumped on the floor of the gin and subsequently and separately cleaned. Upon entering the fan casing 9, the hulls and cotton locks will, of course, be engaged by the blades of the rapidly revolving fan within said casing, with the result that cotton locks mixed with said hulls will be fluffed or opened out so as to enable them to be more readily engaged by the teeth of the saw cylinders 16 and 17. In addition to this action, however, by directing the hulls and cotton locks directly upon the surface of the saw cylinder 16, we practically insure that all particles of cotton and all cotton locks will be engaged by the teeth of the saws. The hulls and some of the cotton locks hitting the surface of the saw cylinder 16 will bounce away from the same and be permitted to pass onward to be thrown into contact with the teeth of the saw cylinder 17, by reason of the curved and inclined shape of the top of the conduit 19 at the central portion of its length. The action of the saws of the cylinder 17 is the same as that described with reference to the cylinder 16, and all cotton carried below the edge of the bottom section 25 will be removed from the saws by the action of the doffer cylinder 18 and discharged into the pipe 14. The hulls practically free from cotton are discharged through the outlet end of the conduit 19 into the pipe 28 whence they are led to the dump.

The doffer 18 may be conveniently formed by securing at suitable intervals lengthwise of a cylinder 33, L-shaped strips 34, the foot of each of which is adapted to travel in close proximity to the surface of the teeth 31 of the two saw cylinders, as fully shown and described in my said companion application.

From the above description, it will be seen that the hulls, cotton locks and particles escaping from the boll extractors 1, 2, 3, and 4 will be drawn by suction through pipe 8 into the fan casing 9, and thence be discharged at high velocity into the conduit 19, and that while the hulls can pass almost uninterruptedly through said conduit to the discharge pipe 28, the cotton locks and particles will be readily engaged by the teeth of the saw cylinders and removed from the hulls. In this way, practically all of the cotton escaping from the cleaning machines, and which would otherwise be lost, is reclaimed.

The doffer 18, by reason of the projections thereon, not only acts to remove cotton from the saw cylinders, but likewise produces a fan action, so that the cotton removed from the saw cylinders will be discharged by the doffer into the pipe 14 and forced up said pipe into the feed pipe 5, whence it joins the main body of cotton passing to the boll extractors. As stated above, Figure 1 is more or less diagrammatic, and any other way of returning the cotton to the boll extractors could be substituted for that shown. In fact, in many cases, the cotton will be discharged from the pipe 14 onto the floor of the gin, and when a sufficient quantity of the reclaimed cotton has been thus deposited, say, enough to make a bale, it may be separately cleaned by being run through one or more cleaning machines, and, in this way, it will be kept separate from the main body of cotton passing through the cleaning machines.

We claim:

1. The method of reclaiming cotton from a mixture of cotton and hulls, which consists in pneumatically propelling the mixed cotton and hulls through a conduit, and stopping the movement of cotton and removing the same from said conduit while causing the hulls to be forcibly separated from the cotton and to be carried uninterruptedly through and out of the conduit under the force of air propulsion.

2. The method of reclaiming cotton from a mixture of cotton and hulls, which consists in continuously pneumatically propelling the mixed cotton and hulls through a conduit, and stopping the movement of cotton and removing the same from said conduit while causing the hulls to be forcibly separated from the cotton and to be carried uninterruptedly through and out of the conduit under the force of air propulsion.

3. The method of reclaiming cotton from a mixture of cotton and hulls, which consists in pneumatically propelling the mixed cotton and hulls through a conduit, projecting the same against a cotton engaging surface which arrests the movement of cotton while the hulls are forcibly separated from the cotton and carried in an uninterrupted manner through and out of the conduit under the force of air propulsion, and continuously moving said surface to remove the engaged cotton from said conduit.

4. The method of reclaiming cotton discharged with hulls from one or more cotton cleaning machines which consists in withdrawing the mixed cotton and hulls from the place of discharge, pneumatically propelling the same through a conduit and simultaneously subjecting the product to impact action to loosen the cotton locks mixed with the hulls, permanently obstructing the passage of cotton through said conduit while permitting the separation and uninterrupted passage therethrough of the hulls under the force of propulsion, and continuously removing the obstructed cotton from the conduit.

5. The method of reclaiming cotton discharged with hulls from one or more cotton cleaning machines which consists in continuously withdrawing mixed cotton and hulls from the place of discharge, agitating the same to loosen up cotton locks mixed with the hulls, continuously pneumatically propelling the mixed cotton and hulls into engagement with a cotton-engaging surface which arrests the movement of cotton while permitting the separation and free passage past said surface of the hulls under the force of propulsion, and continuously moving said surface to withdraw the engaged cotton from the hulls.

6. The method of reclaiming cotton discharged with hulls from one or more cotton cleaning machines which consists in continuously withdrawing mixed cotton and hulls from the place of discharge, agitating the same to loosen up cotton locks mixed with the hulls, continuously pneumatically propelling the mixed cotton and hulls into engagement with a cotton-engaging surface which arrests the movement of cotton while permitting the separation and free passage past said surface of the hulls under the force of propulsion, continuously moving said surface to withdraw the engaged cotton from the hulls, and continuously removing the withdrawn cotton from said surface.

In testimony whereof, we have hereunto set our hands.

JOHN E. MITCHELL.
DENNIS PARKS.